Gustave Barshefsky
Eugene E. Goldstein
INVENTORS

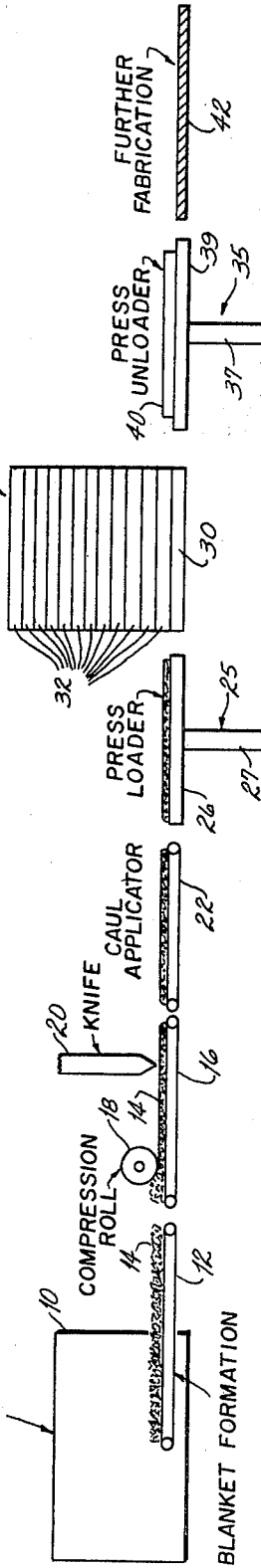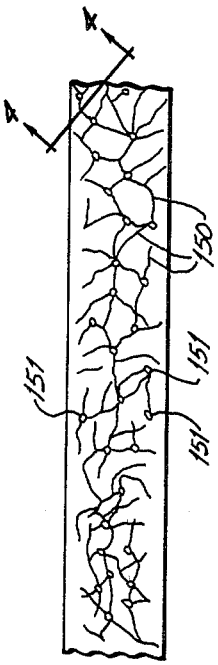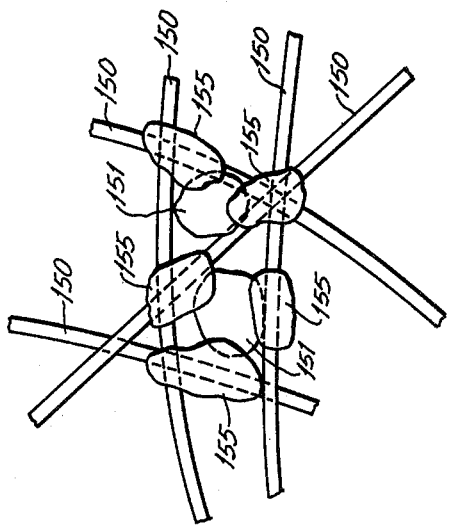

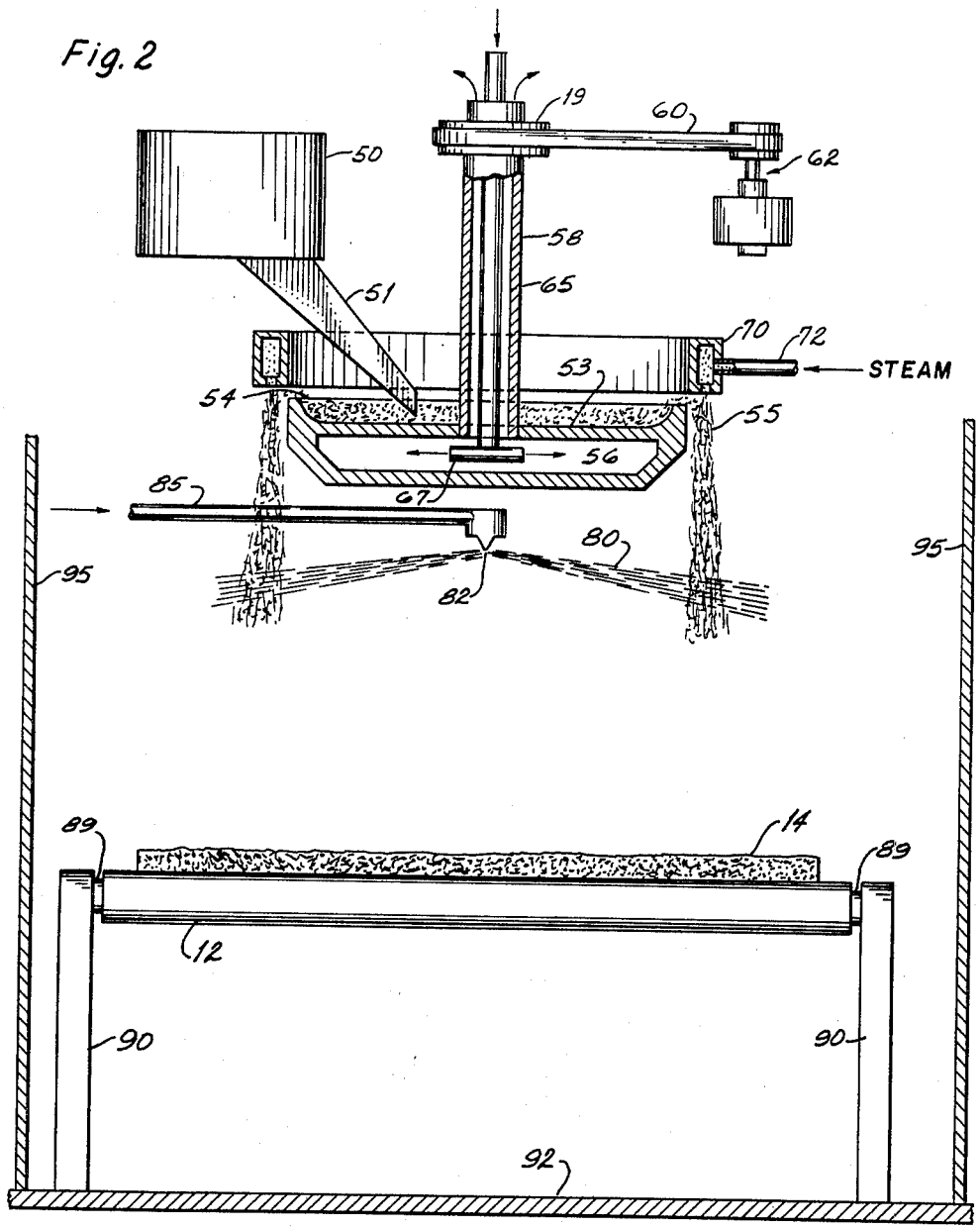

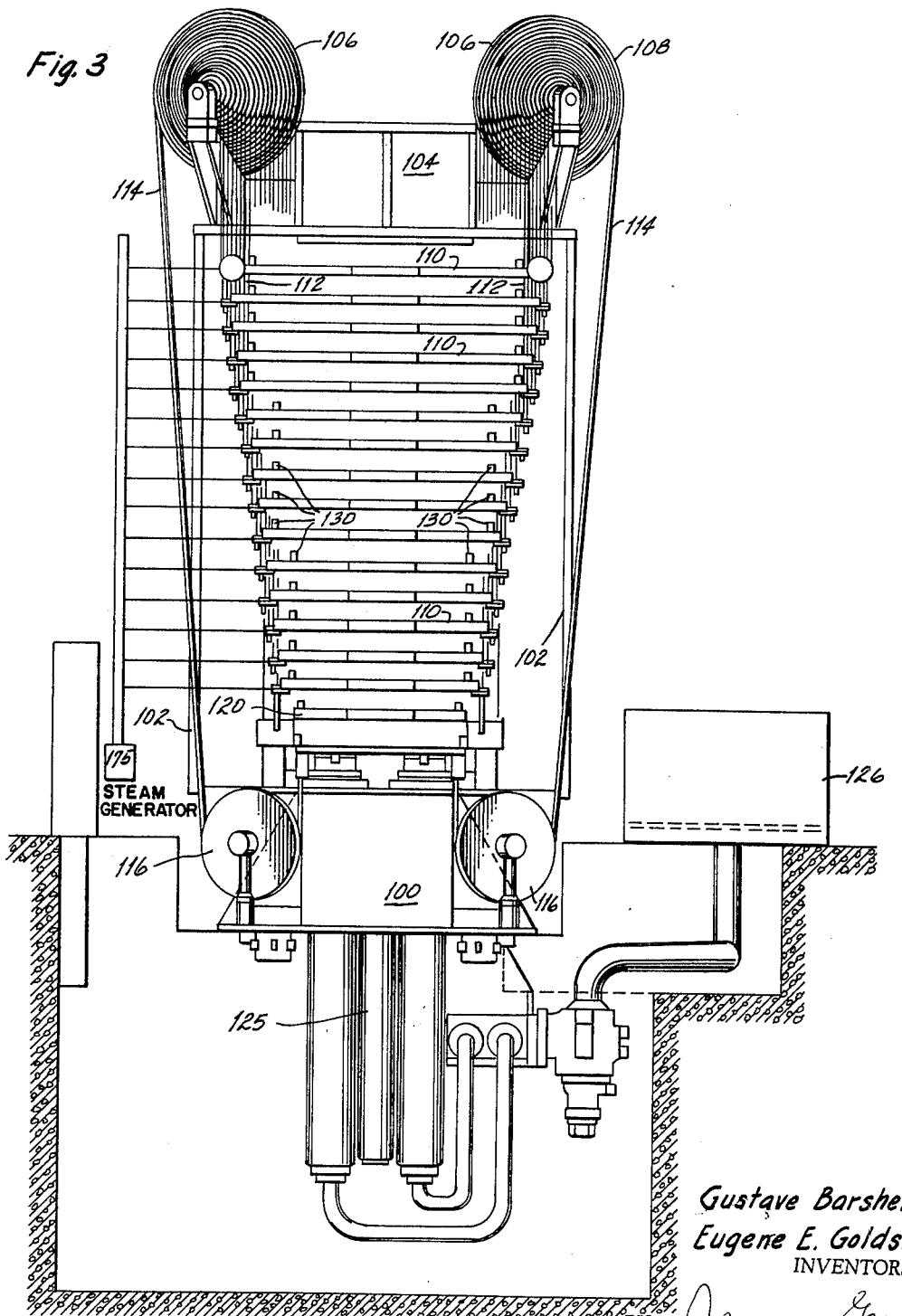

BY James W Grace
ATTORNEY

United States Patent Office 3,478,137
Patented Nov. 11, 1969

3,478,137
METHOD OF MAKING A RIGID PANEL OF MINERAL FIBERS AND DISCRETE PARTICLES WITH RESIN BINDER
Gustave Barshefsky, Chicago, and Eugene E. Goldstein, Evanston, Ill., assignors, by mesne assignments, to The Celotex Corporation, a corporation of Delaware
Original application Sept. 16, 1963, Ser. No. 309,204. Divided and this application May 10, 1967, Ser. No. 637,495
Int. Cl. D04h *1/00;* B32b *5/16*
U.S. Cl. 264—118                           2 Claims

ABSTRACT OF THE DISCLOSURE

This invention relates to a novel method of manufacturing a rigid panel of mineral fibers by uniformly depositing a mixture of mineral wool fibers, resin binder and shot particles to form a mat, precompressing the said mat, cutting the mat into smaller portions of appropriate size and applying heat with pressure simultaneously to a number of said portions to cure the resin and form a plurality of rigid, flat panels simultaneously.

Cross reference to related applications

This application is a division of our prior application, Ser. No. 309,204, filed Sept. 16, 1963, now abandoned and entitled, "Rigid Panel of Mineral Fibers with Resin Binder."

Background of the invention

This invention relates to rigid panels of mineral fibers utilizing a resin binder, and more particularly to a novel method of making such panels and to the resultant product.

Field of the invention

Heretofore, rigid panels have been made of mineral wool fibers or glass fibers having a resin binder dispersed throughout a mat or blanket of such fibers. These panels, although rigid enough to be self-supporting in a suspension grid system, yet have sufficient porosity to serve as effective acoustical materials and heat insulators. The rigidity of the panels occurs because of two factors: first, the mechanical interlocking of the fibers themselves, and secondly, the bonding effect of the resin binder which firmly holds the fibers together at the points where the fibers touch each other.

Since the cost of the resin binder is a significant factor in the economics of manufacturing such panels, a reduction in the amount of binder without a corresponding reduction in the strength of the panel becomes a very important consideration.

Additionally, in the production of mineral fibers, unattenuated solidified minute particles are produced. Heretofore, these particles were believed to be detrimental to the panels because they added weight without contributing to the strength of the product. However, it has been found that if the particles are present within specific ranges of size and amount, they contribute to the strength of the product and effect a more efficient use of the binder.

Description of the prior art

Prior to the present invention, rigid fibrous panels have been made conventionally in a "continuous press" system. By "continuous press" is meant an oven in which the uncured blanket of fibers interspersed with binder is moved therethrough and the binder is cured by the application of heat, usually by forcing heated air through the blanket. Conventionally, the blanket is conveyed between upper and lower moving conveyors. Each conveyor comprises an articulated system of adjacently mounted platens or flights. Although the upper and lower conveyors are engineered to move in unison and in horizontal planes, the ideal is not achieved in actual practice. Uneven wear in the various linkages, and stresses caused by differential heating of the platens and other parts of the mechanism cause the two opposed conveyors to move at different speeds relative to each other and the individual platens do not move in horizontal planes. These mechanical defects cause movement of the fibers within the blanket during the curing time of the resin binder. Because of the movement of the fibers, numerous bonds between the binder and the fibers are being continually broken and the binder sets without achieving the optimum bonding strength of the panel. In partial compensation for this difficulty, an excessive amount of binder is normally used in the preparation of the panel. However, as previously discussed, the inefficient use of the binder results in a more expensive product.

In addition, because of the relative movement of the fibers during the curing period of the binder, the thickness of the panel is not constant and an additional sanding operation must be performed to achieve a flat surface. This additional sanding operation is also necessary because accurate thickness control of the panel is not possible with the mechanical problems hereinbefore discussed.

Where an oven in which opposed conveyors of articulated platens is used, the surface of the resulting product is not smooth, but has ridges corresponding to the areas between adjacent platens. In order to produce a smooth product, at least one surface thereof must be sanded. This additional step is costly and reduces the strength of the panel. Furthermore, provision must be made for the removal and disposition of the material sanded off the surface.

It has been found that in the conveyor press process, there is a slight migration of the resin toward the outer surfaces of the panel to form a thick skin. This slight accumulation of resin, when cured, adds to the rigidity of the panel by providing a reinforcing skin effect. When the panel is subsequently sanded, the thin skin is removed and the rigidity of the panel is reduced. In addition, when one side of the panel is sanded to remove the ridges caused by the areas between the platens and to assure accurate thickness control, it is desirable to sand the other side of the panel to balance the removal of the skin effect from the sanded side to minimize bowing of the panel.

Summary of the invention

It is an object of the present invention to provide a novel method of making a rigid fibrous panel.

It is another object of the present invention to provide a novel method of making a rigid fibrous panel having a predetermined thickness without an additional step of sanding to achieve the desired thickness.

It is yet another object of the present invention to provide a novel method of making a rigid panel with appreciably less resin binder than heretofore possible, resulting in an appreciable lower cost.

It is still another object of the present invention to provide a method of simultaneously making a plurality of flat, rigid panels each of which has enhanced strength and acoustical absorption characteristics despite a significant reduction in the amount of binder therein.

Brief description of the drawing

These and other objects and advantages will be more fully understood and appreciated in the light of the following more detailed description of the preferred embodiment taken in conjunction with the accompanying drawings in which:

FIGURE 1 is a general schematic illustration of the overall operation of the manufacturing process;

FIGURE 2 is an end view partially in cross-section showing the fiberizing and fiber collection apparatus;

FIGURE 3 is an end view of the multiple opening press used in the manufacture of the rigid panel of the invention;

FIGURE 4 is an enlarged view of a portion of the rigid panel of the invention taken along line 4—4 of FIGURE 5;

FIGURE 5 is an end view of a portion of the rigid panel of the invention;

Description of the preferred embodiment

Figure 9:
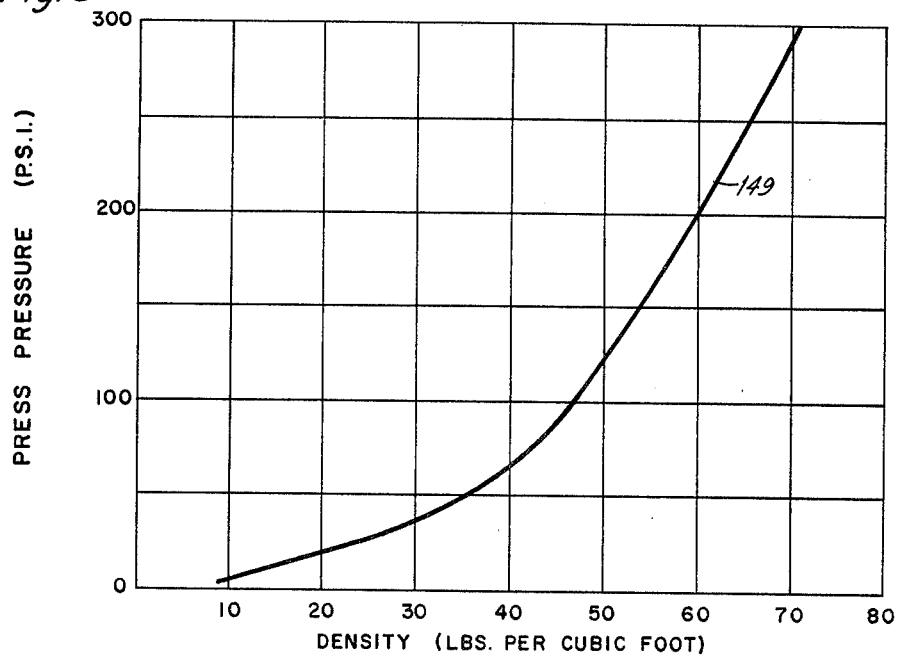
FIGURE 9 is a graph showing the relationship between the density of the finished product and the press pressure.

For a more detailed description of the invention, reference may be had to the figures in the accompanying drawings, and more particularly to FIGURE 1 thereof.

FIGURE 1 illustrates the overall operation of the manufacturing process and shows the major components of the system in schematic form. Subsequent figures will show detailed views of particular portions of the apparatus.

The mineral wool used in the rigid panel of the invention is made in the spinning apparatus and collection chamber 10. A more detailed showing of the spinning apparatus and collection chamber is shown in FIGURE 2. The mineral wool made and collected in the spinning apparatus and collection chamber 10 comprises a fiber ranging in length from a few millimeters up to about four inches in a random fashion. The arithmetic mean diameter of the fiber is approximately 8 microns with a range of from 2 to 15 microns. As will be discussed later, a charge of slag is heated in a cupola and applied to a spinning rotor where the molten slag is divided into multiple streams. Steam under pressure is blasted against the streams to form the thus described mineral wool fiber. In the steam process, not all of the molten slag is converted into fiber, but approximately between 14% and 53% by weight remains in the form of shot. Shot may be defined as small particles of unformed fiber which have been heretofore believed to be detrimental in the production of rigid panels. However, as will be discussed hereafter, the shot within a given amount by weight and of a predetermined size adds to the efficiency of the resin used as a binder in the rigid panel.

As a part of the spinning apparatus there is provided a binder spray apparatus which applies a binder to the fibers and shot produced by the spinning apparatus. The binder may be thermosetting or thermoplastic, and ranges in an amount of between 2% to 17% by weight of the finished panel.

The combined resin coated fiber and shot are collected on a conveyor belt 12 in the form of a thick, uncompressed blanket 14. This blanket is usually 10 to 12 inches in thickness. The conveyor deposits the randomly oriented fiber and shot blanket 14 onto a second conveyor 16 which carries the blanket 14 under a compression roll 18 whereat the blanket is compressed to a thickness of between 3 inches and 8 inches by the compression roll 18. The thickness of the uncured blanket will depend upon the desired thickness and density of the finished product. The compression roll 18 applies a pressure of between 1 pound and 30 pounds per square foot, depending upon the thickness and density desired in the finished product. The compression at this point reduces the uncured blanket 14 to approximately 50% of the original blanket thickness.

Conveyor 16 then moves the compressed blanket 14 under a knife 20 which cuts the mat into desired lengths. The blanket 14, as originally formed, is approximately 4 feet wide, and the lengths as cut by the knife 20 may be from 4 to 16 feet in one-foot increments. The cut blanket 14 is moved to a caul applicator section 22, where a bottom caul 23 is placed underneath each section of blanket 14, and a top caul 24 is placed on top of the blanket. Cauls 23 and 24 may be of sheet aluminum or other metal, such as, iron or steel, large enough to enclose the uncured blanket 14. The purpose of cauls 23 and 24 is to prevent the blanket 14 from sticking to the press plates. In addition, the caul plates serve as carriers between which the uncured blanket and cured panel are carried. A suitable caul release agent, such as zinc stearate, may be used to prevent the blanket 14 from sticking to the cauls. The cauls 23 and 24 present a smooth face to the blanket 14 and this insures a flat, smooth surface on the cured panel. The blanket 14 in its cut form, and sandwiched between cauls 23 and 24, is deposited upon a press loader 25. Press loader 25 comprises a platform portion 26 upon which each of the cut portions of the compressed blanket are placed in sequence. A hydraulically operated plunger 27 raises platform 26 in steps so that the cut portions of the uncured blanket may be inserted between platens of a multiple opening press 30.

The press 30 is described in greater detail in FIGURE 3, but in general comprises a series of spaced heated platens 32. Each of the cut portions of the uncured blanket 14 is placed between adjacent pairs of heated platens 32. A suitable multiple platen press has about twenty openings for the reception of the uncured portions of the blanket. After each of the openings has received the blanket, the press is then operated so as to apply heat and pressure uniformly to the portions of the uncured blanket in the press. The uncured blanket 14 remains in the press for approximately eight minutes, during which time the heat applied thereto sets the resin and the platens hold the blanket to a predetermined thickness while the resin sets. As will be discussed hereinafter, the press time may be varied from 2.5 minutes for a panel of a density of 9 pounds per cubic foot to 12 minutes for a panel of about 30 pounds per cubic foot, depending upon the curing temperature. After the setting cycle, the press is opened and the cured boards are removed by a press unloader 35, which is similar to the press loader 25. A hydraulic ram 37 raises and lowers a plate 39 which assists in the removal of the boards from the press.

The cured boards, designated as 40, are removed for further fabrication in the area designated 42. This further fabrication consists of removing the cauls, trimming the board to the desired length and width, applying paint coating to the face surface thereof, or laminating a suitable finishing mat to the face surface of the finished panel.

The mechanical details of the caul applicator 22, the press loader 25 and the press unloader 35 have not been set forth as these details do not form a part of the invention, and the apparatus involved may be purchased or contracted for.

While the general overall process has been described, reference may now be had to FIGURE 2 for a more detailed description of the apparatus for forming an uncured blanket.

The slag or other vitreous material from which the fiber is formed is melted in a conventional cupola 50. The temperature of the slag in cupola 50 is generally in the order of 2600° F., at which temperature the slag flows freely and has a relatively low viscosity. A trough or chute 51 is provided through which the molten slag flows downwardly to the upper face 53 of a rotor 55. Upper face 53 of rotor 55 has a slightly concave shape terminating at its periphery in a slightly thick lip 54. As the slag flows down chute 51, its temperature drops slightly to about 2400° F. and its viscosity increases.

Rotor 55, which may be of cast material, such as iron, is circular and has a hollow inner chamber 56. Rotor 55 is caused to spin at a high velocity around its axis by means of a shaft 58, a belt 50, and a motor and drive mechanism 62. Shaft 58 is hollow and has a pipe 65 concentrically mounted within. Pipe 65 has a distributor 67 at its lower end. A coolant, such as water, is introduced through pipe 65 and caused to flow through chamber 56 to cool the rotor and aid in reducing the temperature of the slag on the face of the rotor so that a desired viscosity of slag is achieved. The coolant flows out of chamber 56 between the pipe 65 and the interior of hollow shaft 58.

A steam ring or annulus 70 is mounted around the rotor to provide a blast of steam which intercepts the slag streams centrifically thrown outwardly over the lip 54 of rotor 55, and attenuates the slag in the streams into fine fibers. An amount of slag from the streams fails to attenuate into the desired fibers and results in the shot heretofore described. A steam pipe 72 is connected to ring 70 to supply steam under pressure from a boiler or other source (not shown). The blast of steam emerges from the ring 70 under a pressure of from about 80 to 100 lbs. per square inch, and in an amount of about 2 pounds of steam for each 1 pound of molten material.

As the combined fiber and shot are carried downwardly, resin 80 in the form of fine droplets is sprayed into the descending cone of fibers and shot, through a nozzle 82. Nozzle 82, which has a series of fine orifices, is connected to a pipe 85 through which the resin is pumped under pressure from a source (not shown).

The fibers and shot now coated with the resin 80 are collected in the form of an uncured blanket 14 on a conveyor 12 (discussed hereinbefore with reference to spinning apparatus and collection chamber 10). Conveyor 12, which may be a conventional belt conveyor, is supported by journals 89 at the upper end of a frame 90. Frame 90 is supported on a foundation 92. Side walls 95 in conjunction with a front and back wall (not shown) complete the collection chamber.

The hot plate press 30 is shown in greater detail in FIGURE 3. This press is commercially available from Williams-White & Company, and is shown in U.S. Patent No. 2,941,249. However, to illustrate the novel process of the invention, a brief general description of this press is given with reference to FIGURE 3.

In general, the press comprises a base 100 which supports pillars 102 arranged at four corners of the base and extending upwardly to a top framework 104. At each of the four corners of framework 104 there is a pulley 106 which has a series of sheaves or pulley grooves 108. These grooves are of decreasing diameter outwardly from the base of the pulley. A series of platens 110 are suspended in spaced relationship by means of cables 112. The cables 112 are arranged so that the cable supporting the lowermost platen 110 is carried by the groove or sheave having the largest periphery. The cables 112 connected to the other platens are arranged so that the nearer the platen is to the top of the press, the smaller is the diameter of the groove around which its corresponding cable rides. A cable 114 is connected around the outer periphery of the groove of largest diameter in pulley 106 and extends downwardly through a pulley 116. The lower end 118 of cable 114 is connected to the bottom platen 120. Platen 120 is forced upwardly through a hydraulic power system 125 connected to a hydraulic driving unit 126.

As hydraulic fluid is pumped from hydraulic driving unit 126 to the hydraulic power system 125, platen 120 is forced upwardly. As platen 120 moves upwardly it carries with it the lower end 118 of cable 114, causing each of the pulleys 106 to rotate. As pulleys 106 rotate at the four upper corners of the press, they cause the respective cables 112 connected to the individual platens 110 to move these platens closer together in a uniform manner.

The rate of closure between any two of the platens 110 is the same as the rate of closure between any other two of these platens. Thus, pressure is evenly and simultaneously applied to any material lying on the platens. Platens 110 are connected over flexible tubes 122 and a common pipe 123 to a source of heat which may be, for example, a steam generator 125. Thus, the press applies heat and pressure uniformly and simultaneously to the material lying between the platens.

To assure accurate thickness control of the cured panel, spaces 130 are attached along the upper, outer edges of the platens 110 and 120. The thickness of these spacers 130 is equal to the desired final thickness of the rigid panels.

After a suitable press cycle, which will be described in greater detail hereinafter, the press is opened and by means of press unloader 35, the material is removed from press 30 and undergoes such further fabrication as may be desirable.

Thus far the process for forming the novel rigid panels of the invention has been set forth in general terms. A more detailed explanation of the salient features of the invention will now be described.

It should be recalled that the fiber formed in the spinning and collection chamber 10 has an average diameter of 8 microns and varies in a range of from 2 to 15 microns. The length of the fiber ranges from a few millimeters to about 4 inches. In addition, from about 14% to 53% by weight of the final panel is shot.

To further define the shot, the following sieve analysis is presented:

SIEVE ANALYSIS

| Sieve | Percent retained | |
|---|---|---|
| | Typical | Range |
| 10 mesh | 0.0 | 0–1 |
| 30 mesh | 8.2 | 5–8 |
| 50 mesh | 38.1 | 30–40 |
| −50 mesh | 53.7 | 50–60 |

It should be noted that over 50% of the shot falls through a 50-mesh screen.

The binder used in making the rigid panel may be either thermosetting or thermoplastic. Typical thermosetting binders are phenol formaldehyde, urea formaldehyde and melamine formaldehyde. Typical thermoplastic binders are polyvinyl alcohols, polyvinyl acetates, polyvinyl chloride, and acrylic resins. The amount of binder which may be used may range from 2% to 17% by weight of the finished product. The amount of binder, as will be discussed hereinafter, depends upon the desired thickness and density of the finished product.

The temperature range for curing the phenolic type binder is from 350° to 450° F. At temperatures below 350° F. the resin curing time is too long to be of practical use; while at temperatures above 450° F. the resin tends to over-cure and forms a brown crust on the surface of the panel. The press pressure may vary from 1 pound per square inch for a board of ½″ thickness and 9 pounds per cubic foot density, to 290 pounds per square inch for ½″ thick board with 70 pounds per cubic foot density. Experimentally, it has been determined that the time in the press depends upon the temperature to which the cured resin is subject, and to the density of the blanket for a given thickness of the blanket. For thermoplastic resin, the temperatures may be in the area of 250° F.

The following table shows the curing time at different temperatures for a panel ¾″ thick:

| Time (min.) | Temp. (° F.) | Density |
|---|---|---|
| 7 | 350 | 9–11 lbs. per cubic foot. |
| 6 | 400 | Do. |
| 2.5 | 450 | Do. |
| 9 | 350 | 16–19 lbs. per cubic foot. |
| 8 | 400 | Do. |
| 6 | 450 | Do. |
| 12 | 350 | 26–30 lbs. per cubic foot. |
| 10 | 400 | Do. |
| 7 | 450 | Do. |

The following table shows the curing times at the same temperature for a panel ½" thick with different densities:

| Time (min.) | Temp. (° F.) | Density |
|---|---|---|
| 4 | 350 | 9.6 lbs. per cubic foot. |
| 5 | do | 12.6 lbs. per cubic foot. |
| 6 | do | 33.0 lbs. per cubic foot. |
| 7 | do | 40.0 lbs. per cubic foot. |
| 8 | do | 70.0 lbs. per cubic foot. |

From these tables it can be seen that for the optimum temperature range of between 350° F. and 450° F. the heating and pressure time ranges from 2.5 minutes to 12 minutes. It can also be seen that for a given thickness of panel, the time in the press increases as the density increases. However, for this time range the rigid panel of the invention can be produced in a density range of between 9 and 70 pounds per cubic foot on a multiple opening press within the economics of a competitive product.

It has also been determined that for panels up to 1.5 inches in thickness, comparable relationships exist between the time in the press, the temperature, and the density of the rigid panel.

The time-temperature data presented in the foregoing tables was determined with reference to a particular thermosetting resin. However, the time-temperature characteristics for other thermosetting and thermoplastic resins will be comparable, and the press time can be determined for any other resin whose time-temperature curve is known. The time-temperature curves, showing cure rates for resins, are generally supplied by the resin manufacturer.

Reference may be had to FIGURE 9 which shows the press pressure versus density relationship for boards ½" thick. In FIGURE 9 the density of the finished panel in pounds per cubic foot is plotted as abscissa, while the press pressure is plotted as ordinate. Line 149 represents the relationship between press pressure and density for ½" thick finished product. It may be seen that the density of the finished product is a straight line function of the press pressure up to a density of about 35 lbs. per cubic foot. For greater densities of the finished product, the press pressure increases rapidly, so that for a product having a density of 70 pounds per cubic foot, the press pressure is 290 pounds per square inch.

Reference may be had to FIGURES 4 and 5 which show the finished product produced by the flat plate pressing technique of the invention. FIGURE 4 is an enlarged view of a portion of the product taken along lines 4—4 of FIGURE 5. FIGURE 5 shows the product in its cured state in which mineral wool fibers 150 are felted to form a mat of desired density and strength. Shot particles 151 are interspersed throughout the mat and serve as bridges to reduce the tendency of the fibers to break under stress and make a product which is equal in strength to a similar resin formed product made by a conveyor oven. The flat plate pressed product requires much less resin binder than a product of comparable strength made by the conveyor press method.

Figure 6:
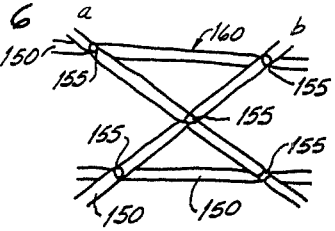
FIGURES 6 and 7 are views of portions of a cured panel with and without shot to aid in explaining the mechanism of the invention.
Figure 7:
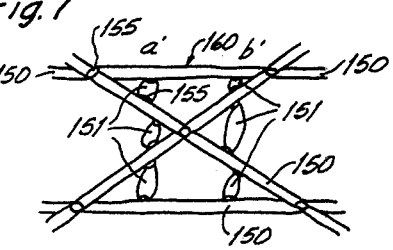

FIGURES 4, 6 and 7 show in greater detail the manner in which the mineral fibers are bonded to each other and the effect of the shot incorporated in the product. As can be seen in FIGURE 4, the mineral wool fibers 150 form an interfelted mat. Particles of shot 151 are dispersed throughout the mat, and resin 155 ties together the shot particles 151 and the mineral wool fibers 150. It can be seen that shot particles 151, to the left in FIGURE 4, form a bridge between the enclosing mineral wool fiber 150, and because of the set resin inhibits displacement of these fibers relative to each other. It is apparent that if resin alone were to act as the bridge between the fibers, that more resin would be needed for the same amount of rigidity in the panel. Thus, the shot particles in the panel make the resin more effective, as less can be used for a rigid panel.

With reference to FIGURES 6 and 7, there are shown in schematic forms a theoretical exposition of the reason why the shot contributes to a stronger product. FIGURE 6 illustrates a portion of a product in which the cured resin binds the fibers 150 together at the points of contact of the fibers and there is no shot. The arrow 160 represents the application of a force downwardly on the top fiber. It should be noted that the force is applied to the fiber with a span $a$–$b$. In contrast with the conditions of FIGURE 6, FIGURE 7 illustrates a similar product with shot particles 151. The heavy dark lines emphasize and point out the points of bond between the shot particles and the fiber 150. Now it can be seen that the shot particles 151 form bridges intermediate the points of contact of the fibers 150. In addition, if a force is applied, as shown by the arrow, the span of the top fiber is only $a'$–$b'$. This shorter span resists breakage of the top fiber to a greater extent than that shown in FIGURE 6. It is thus seen that the presence of the short particle 151 greatly enhances the strength and rigidity of the resin cured product and accounts for the more efficient use of the resin.

If the shot particles are too small or fine, their effectiveness is not as pronounced as larger particles. In addition, the amount of shot particles by weight of the finished product becomes important because, as the amount of shot particles increases, the amount of fibers decreases for a given weight of board. As the amount of fibers becomes less than 47% by weight, the strength of the panel is impaired and an excessive amount of resin may have to be used. As the amount of shot particles becomes less than 14%, and the amount of fibers becomes greater than 86%, the effectiveness of the shot particles as bridges lessens and again an excessive amount of resin may have to be used. Thus the range of the interfelted fibers lies between 47% and 86% by weight of the board.

The size of the shot particles also becomes important. The sieve analysis of the shot particles shows that particles larger than those which are retained on a 10 mesh screen are not important, and that about 30% to 40% of the shot particles by weight should be retained on a 50 mesh or greater screen with about 50% to 60% being small enough to pass through a 50 mesh screen. It is believed that this range of shot size is the optimum for greatest strength and rigidity of the product.

Figure 8:
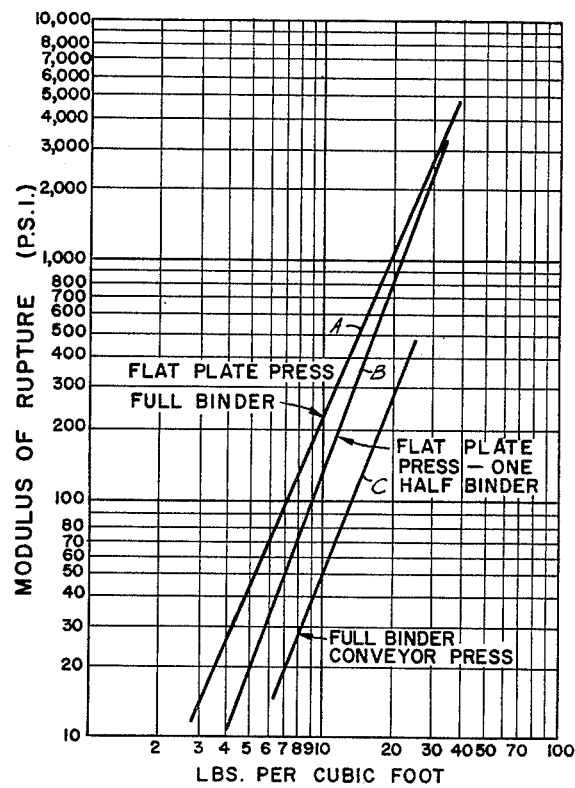
FIGURE 8 is a graph of the strength of the cured panels of the invention and a prior art panel in terms of the density of each panel.

To show the overall effect of the use of the flat plate press of the invention in contrast to the use of the conventional, continuously moving conveyor press, reference may be had to FIGURE 8. In this figure the strength of the product produced by each method as measured in terms of modulus of rupture is plotted as a function of density in pounds per cubic foot of finished product. Line A represents the strength characteristic of the finished product when an amount of resin is used equal to that in the conveyor press product. Line B represents the strength characteristic of the finished product when only one-half as much binder is used as in the conveyor press product. Line C represents the strength characteristic of the product produced in the conveyor press. It can be seen that for the flat plate pressed product, the strength is greater at each density, and in fact even for the product which has only one-half as much binder as the conveyor press product, the strength is greater than a product of the same density made by the conveyor press. For this example, the full binder condition is that in which the resin is about 9% by weight of the panel and the one-half binder condition is that in which the resin is about 5% by weight of the panel.

For example, for a product with a density of 10 pounds per cubic foot, the M.O.R. of the product with full binder (line A) is about 200 pounds; the M.O.R. of the product with only one-half as much binder (line B) is about 110 pounds; and the modulus of rupture (M.O.R.) of the product made in the conveyor press (line C) is only about 43 pounds. Thus, it is apparent that the product produced by the flat plate press is far superior to that produced by the conveyor press.

In addition, the range of density of the product made by the flat plate press is far larger than that of the product made by the conveyor press. In order to make a product having a density range of between 4 pounds per cubic foot and 70 pounds per cubic foot, the press must have a pressure range of between 0 pounds per square inch to 290 pounds per square inch. This range is easily achievable in a flat plate press such as that described herein. However, it is impractical to achieve such a range of pressures with the conveyor oven press due to the mechanical problems involved.

In order to make the use of a flat plate press economically feasible, it is necessary to provide a multiple opening press of the type described. If a press with only one set of pressing plates were used, the rate of production would not be rapid enough to make rigid panels at a commercially practicable cost. In addition, in order to produce constant pressure and temperature conditions on the board in a multiple opening press, it is important that a simultaneous platen closing press be employed. In this way the same pressure and temperature conditions can be maintained for any desired product so that uniformity in density and strength can be achieved.

In summary, there has been presented a novel method for making a rigid panel by means of a flat plate press, and particularly a flat plate press having a plurality of platens which simultaneously apply heat and pressure within a specific range to an interfelted blanket of mineral wool fibers, shot particles, and resin. In addition, the novel product has been set forth with reference to its ingredients and the proportions thereof.

In the following claims, all percentages of ingredients are given in percent by total of the finished product.

We claim:
1. The method of simultaneously making a plurality of flat rigid fibrous panels, comprising:
    (a) preparing a blanket of deposited interfelted mineral wool fibers, mineral wool shot particles, and uncured resin, said shot particles being no larger than 10 mesh in which 4–8% are retained on a 30 mesh screen and 30–40% are retained on a 50 mesh screen,
    (b) compressing said blanket to a thickness of about one-half its original thickness,
    (c) cutting said blanket into individual flat portions,
    (d) assembling a stacked array of a plurality of said portions intermediate of and separated between flat platens,
    (e) applying an increasing pressure at a uniform rate to all portions in said array to a uniform pressure of 1–290 p.s.i.,
    (f) simultaneously heating under said uniform pressure and without movement thereof said portions to a temperature of 250–450° F. to cure said resin, and
    (g) relieving said pressure and cooling said portions to ambient temperature to thereby form said flat rigid panels.

2. The method of simultaneously making a plurality of flat, rigid panels as set forth in claim 1, in which said blanket is made of between 47% and 86% interfelted mineral wool fibers, between 14% and 53% of mineral wool shot particles and of between 2% and 17% of uncured resin binder.

References Cited
UNITED STATES PATENTS

| | | | |
|---|---|---|---|
| 2,255,227 | 9/1941 | Parsons | 65—10 |
| 2,790,741 | 4/1957 | Sonneborn et al. | 264—122 |
| 3,012,923 | 12/1961 | Slayter | 156—62.2 |

FOREIGN PATENTS 568,574   4/1945   Great Britain.

ROBERT F. WHITE, Primary Examiner

J. R. HALL, Assistant Examiner

U.S. Cl. X.R.

264—120, 122